Figure 1:
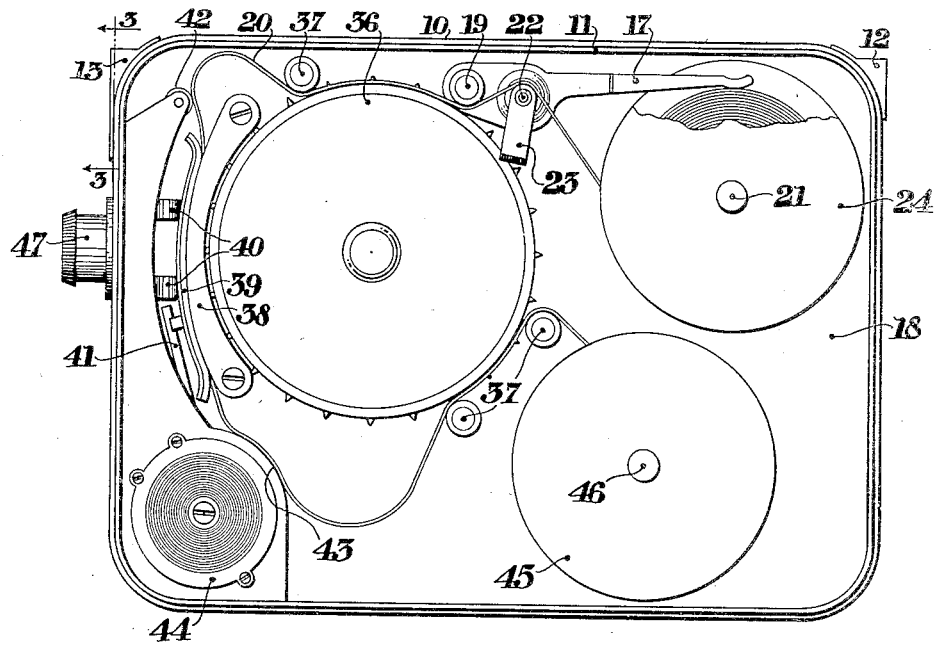

July 23, 1935.  J. MIHALYI  2,008,988

FILM FOOTAGE METER FOR MOTION PICTURE CAMERAS

Filed May 8, 1931

Joseph Mihalyi,
Inventor,

By Newton M. Permes
George A. Gillette, Jr.
Attorneys

Patented July 23, 1935

2,008,988

UNITED STATES PATENT OFFICE 2,008,988

FILM FOOTAGE METER FOR MOTION PICTURE CAMERAS

Joseph Mihalyi, Rochester, N. Y., assignor to Eastman Kodak Company, Rochester, N. Y., a corporation of New York Application May 8, 1931, Serial No. 535,839

10 Claims. (Cl. 33—172)

The present invention relates to a photographic camera and more particularly to the combination of the view finder and film supply indicating means within a motion picture camera.

Heretofore, in operating a motion picture camera, the photographer has been compelled to cease taking pictures in order to determine the condition of the film supply in the camera. This has been particularly true of motion picture cameras which have footage or film supply indicating means located to be observed from the top, sides or ends of the camera. Such location of the indicating means makes it necessary to discontinue operation of the camera in order to determine the quantity of unexposed film within the camera, unless the operator or photographer is willing to assume the risk of merely aiming the camera without using the view finder while he takes a quick glance at the film supply indicating means.

The principal object of the present invention is to provide a motion picture camera in which the film supply indicating means is so located that it may be observed through the view finder.

Another object of the present invention is the provision of a film supply indicating means which is held in definite contact with the outer convolution of film on the supply reel by means of tension in the film.

A further object of the invention is the provision of a film supply indicating means which magnifies the decrease in diameter of the film supply reel for more accurate indications on a graduated member.

Still another object of the invention is the provision of a camera casing provided with apertures to form a direct view finder, and having the graduated member of the film supply indicating means located adjacent the front sight of the view finder so that both may be observed through the rear sight of the view finder.

A still further object of the invention is the provision of a magnifying lens in front of the rear sight of the view finder to facilitate reading of both the graduated member of the film supply indicating means and the front sight of the view finder.

With these objects in view, my invention consists in certain features of novelty in construction, combination, and arrangement of parts by which the said features and certain other features, hereinafter appearing, are effected.

Reference is now made to the accompanying drawing in which like reference numerals designate similar parts and in which:

Fig. 1 is a side elevation of a motion picture camera embodying my invention but with the cover removed.

Figure 2:
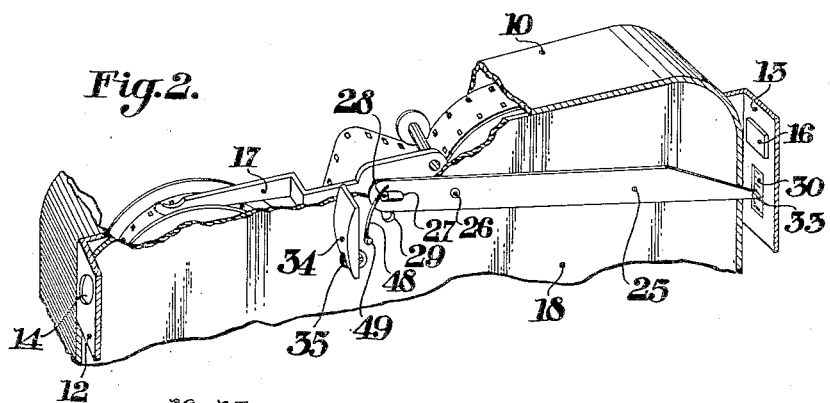
Figure 3:
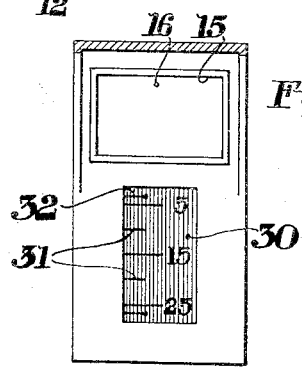

Fig. 2 is a fragmentary perspective view of a camera according to the invention showing particularly the location of the view finder and of the film supply indicating means within the camera, and Fig. 3 is a vertical section of the camera casing taken on the line 3—3 of Fig. 1 showing the relative location of the front sight of the view finder and the graduated member of the film supply indicating means.

In the illustrated embodiment of the present invention the camera casing 10 is provided with a flange 11 to form a light-tight connection with the cover (not shown). The camera casing 10 also includes a rear sight housing 12 and a front sight housing 13 provided with apertures 14 and 15 respectively, aperture 14 in the rear sight housing being preferably round while aperture 15 in the front sight housing is preferably rectangular. Lens 16 may be positioned behind front sight or aperture 15 if it is desired to make said front sight of small dimensions to promote compactness in the construction of the camera. Aperture 14, which forms the rear sight of the view finder, may be left open as shown in Fig. 2, or may be provided in a known manner with ordinary plate glass or a lens as desired. This provision of a view finder comprising front and rear sights within the camera casing is known. However, the location and combination of a view finder with respect to a film supply indicating means is deemed to be novel and will now be described.

The film supply indicating means comprises an arm 17 which is pivotally mounted on the central partition 18 by means of a pivotal support 19 which also functions as a guide stud for the film 20 in its passage through the camera. This arm 17 is adapted slidably to engage the outer convolution of film on the reel 24, which is freely rotatable upon the stud shaft 21 which is rigidly mounted on the central partition 18. A post 22 is attached to arm 17 in an intermediate position and has a thumb piece 23 fastened to the outer end thereof to facilitate movement of the arm 17 to a position which allows insertion or removal of the reel 24. Thus, it will be seen that the film 20 passes from the reel 24 over post 22 and under guide stud 19 so that tension in the film 20 will move the free end of arm 17 into sliding contact with the outer convolution of film 20 on the reel 24.

A pointer 25 is pivotally mounted at 26 on the other side of central partition 18. Movement of arm 17 is transmitted to pointer 25 by a pin and slot connection, which connection may comprise a slot 27 provided in one end of pointer 25 engaging a pin 28 located on arm 17 opposite post 22, central partition 18 being slotted at 29 to allow free movement of pin 28 within partition 18.

The arrangement of guide post 22 causing the tension in the film to hold the free end of arm 17 against the outer convolution of the film on reel 24 may be supplemented or entirely replaced by an arcuate spring 48 which is mounted upon central partition 18 by means of a machine screw 49 and which has its free end slidably engaging a notch in pin 28.

The front sight housing 13 is provided with a graduated member adjacent the front sight 15 and its corresponding lens 16. This graduated member may be a translucent window 30 which is provided with a scale comprising lines 31 and corresponding numerals. The scale on window 30 is inverted so that the zero line 32 thereof is the nearest line of the scale to the front sight 15. The advantage of inverting the scale in this manner is that the readings approaching zero, which are the most critical readings on the scale, may be observed without appreciably shifting the focus of the eye from the front sight 15 in order to determine when the film supply has been exhausted. The other end of pointer 25 is tapered and bent at right angles so that the bent portion 33 will move in front of the graduated member or translucent window 30.

A plano-convex lens 34 is positioned by means of bracket 35 on the central partition 18 and is so located that it is in alignment with the front and rear sights of the view finder and with the graduated member or translucent window 30. The lens 34 functions to magnify the finder field as well as the lines and numerals on the window 30 so that both may be easily and readily observed through the rear sight or aperture 14.

The remaining elements of the camera which have been disclosed and which will now be described form no part of the present invention but are of well-known construction and may be replaced by equivalent elements of similar function. The sprocket wheel 36 is rotated by a self-contained spring motor (not shown) and a plurality of guide studs 37 are mounted in central partition 18 adjacent the sprocket wheel 36 to insure engagement of the film perforations with the teeth on said sprocket wheel along certain portions of the periphery thereof. The film 20 is formed in a loop by the sprocket wheel 36 and guide studs 37 to pass between gate members 38 and 39. The front gate member 39 is pressed by springs 40 to cause the required frictional engagement of the gate members 38 and 39 with the film 20. The pulldown arm 41 intermittently engages the film 20 in the gate to intermittently move the loop of said film through said gate. The film is also guided through the loop by means of a roller 42 and a round portion 43 which forms a casing for the governor, not shown, but situated behind the cover plate 44.

The take-up reel 45 is detachably mounted on and driven by shaft 46 which is driven in a known manner by the spring motor within the sprocket wheel 36. The sprocket wheel 36, guide studs 37, gate members 38 and 39, pulldown 41 and take-up reel 45 are all intended to be included within the generic term "film advancing mechanism" as used in the appended claims.

A lens mount 47, of known internal construction, is mounted on the front of camera casing 10.

The operation of the film supply indicating means which may be observed through the finder in the camera will be described hereinafter. With the cover of the camera casing removed, as shown in Fig. 1, the arm 17 of the film supply indicating means is moved to its uppermost position against the casing 10 by pressing against the end of the thumb piece 23. This allows insertion of the reel 24 which, as before stated, is freely rotatable upon shaft 21. The film 20 is then threaded over the post 22, under guide stud 19, around the sprocket wheel 36, passing between the gate members 38 and 39 to the take-up reel 45. The cover is replaced and locked into position whereupon operation of the film advancing mechanism will create tension in the film to hold the free end of arm 17 against the outer convolution of film 20 on reel 24. As previously stated, this manner of holding the free end of arm 17 against the film on reel 24 may be replaced or supplemented by the action of spring 48 on pin 28.

Release of the film advancing mechanism will cause the film 20 to unwind from reel 24 with a corresponding reduction in the diameter of the film on this reel. The free end of arm 17 will pivot about the guide stud 19 to remain in contact with the outer convolution of film 20 by either or both of the means described above. This movement of arm 17 is transmitted to pointer 25 through the medium of the pin and slot connection comprising pin 28 and slot 29 whereupon the bent portion 33 will be moved in front of the scale on translucent window 30. The pointer 25 magnifies the movement of arm 17 so that bent portion 33 moves through a greater distance than the free end of arm 17. The scale on translucent window 30 is calibrated so that the length of unexposed film on reel 24 can be correctly and readily determined by observation of the position of bent portion 33 in front of window 30. This observation of window 30 may take place during the operation of the camera or may, of course, also take place when the camera is not in operation. If the camera is in operation, however, it will not be necessary to discontinue the exposure of film in order to determine the quantity of unexposed film remaining on reel 24 because the operator or photographer may either glance at the position of pointer 25 before the window 30 to read the quantity of film remaining unexposed or, with sufficient experience, may simultaneously observe the objects being photographed and the position of the pointer before the graduated member. In either case, it will not be necessary to discontinue operating the camera.

Having now particularly described my invention, what I claim and desire to protect by Letters Patent of the United States is:

1. In a motion picture apparatus which is adapted to include a film roll, the combination with a means for supporting the film roll for rotation about an axis, and an advancing means for moving the film strip with respect to said film roll, whereby the diameter of said film roll is varied, and creating tension in the section of the film strip which is adjacent to said film roll, of a member mounted for movement in the plane of said film roll, having a portion for engaging the tensioned section of the film strip, and having a portion for contacting without substantial friction the outer convolution of said film roll regardless of the diameter of said film roll and movable into such contact under the influence of the tension in said section of said film strip.

2. In a motion picture apparatus which is adapted to include a film roll, the combination with a means for supporting the film roll for rotation about an axis, and an advancing means for moving the film strip with respect to said film roll and creating tension in the section of the film strip which is adjacent to said film roll, of a member mounted for movement in the plane of said film roll, having a portion for engaging the tensioned section of the film strip, having a portion for contacting the outer convolution of said film roll and movable into such contact under the influence of the tension in said section of said film strip, and having a portion engaging the edge of said section of the film strip for laterally guiding the same.

3. In a motion picture apparatus which is adapted to include a film roll, the combination with a means for supporting the film roll for rotation about an axis, and an advancing means for moving the film strip with respect to said film roll, whereby the diameter of said film roll is varied and creating tension in the section of the film strip which is adjacent to said film roll, of an indicating means including a member mounted for movement in the plane of said film roll, having a portion for engaging the tensioned section of the film strip, and having a portion for contacting the outer convolution of said film roll regardless of the diameter of said film roll and movable into such contact under the influence of the tension in said section of said film strip.

4. In a motion picture apparatus, the combination with an arm having one end pivotally mounted and having the other end adapted slidably to engage the outer convolution of film on a film reel, an advancing mechanism adapted to move the film in a normal path, and a pointer moved by said arm, of a means intermediately located on said arm for engaging the film, displacing the film from said normal path toward said arm and drawn toward the normal path of the film by the tension therein.

5. In a motion picture apparatus, the combination with an arm having one end pivotally mounted and having the other end adapted slidably to engage the outer convolution of film on a film reel, an advancing mechanism adapted to move the film in a normal path, and a pointer moved by said arm, of a post intermediately located on said arm for engaging the film, displacing the film from said normal path toward said arm and drawn toward the normal path of the film by the tension therein.

6. In a motion picture apparatus, the combination with an arm having one end pivotally mounted and having the other end adapted slidably to engage the outer convolution of film on a film reel, an advancing mechanism adapted to move the film in a normal path, and a pointer moved by said arm, of a means intermediately located on said arm for engaging the film, displacing the film from said normal path toward said arm and drawn toward the normal path of the film by the tension therein, and a resilient means for holding said arm against the outer convolution of film on the film reel whereby the arm is held against the outer convolution of film both by the tension therein and by the tension in said resilient means.

7. In a motion picture apparatus, the combination with an arm pivotally mounted and adapted slidably to engage the outer convolution of film on a film reel, a sprocket wheel for unwinding film from said reel in a normal path, and a pointer moved by said arm, of a means on said arm for engaging the film between the sprocket wheel and the film reel, for displacing the film from said normal path and drawn toward the normal path of the film by the tension therein.

8. In a motion picture apparatus, the combination with an arm having one end pivotally mounted and having the other end adapted slidably to engage the outer convolution of film on a film reel, a sprocket wheel for unwinding film from said reel in a normal path, and a pointer moved by said arm, of a means intermediately located on said arm for engaging the film between the sprocket wheel and the film reel, and for displacing the film from said normal path toward said arm.

9. In a motion picture apparatus, the combination with an arm having one end pivotally mounted and having the other end adapted slidably to engage the outer convolution of film on a film reel, a sprocket wheel for unwinding film from said reel in a normal path, and a pointer moved by said arm, of a post intermediately located on said arm for engaging the film between the sprocket wheel and the film reel, and for displacing the film from said normal path toward said arm.

10. In a motion picture apparatus, the combination with an arm having one end pivotally mounted and having the other end adapted slidably to engage the outer convolution of film on a film reel, a sprocket wheel for unwinding film from said reel in a normal path, a plurality of guide studs spaced around said sprocket wheel, said arm being pivotally mounted on one of said studs, and a pointer moved by said arm, of a post intermediately located on said arm for engaging the film between the sprocket wheel and the film reel, and for displacing the film from said normal path toward said arm.

JOSEPH MIHALYI.